United States Patent Office 3,178,446
Patented Apr. 13, 1965

3,178,446
OXYETHYLATION OF IMIDAZOLE COMPOUNDS
Remo Sannicolo, Milan, Italy, assignor to Instituto Luso-Farmaco S.A.R.L., Lisbon, Portugal
No Drawing. Filed Sept. 19, 1961, Ser. No. 139,064
Claims priority, application Portugal, July 27, 1961, 38,589
7 Claims. (Cl. 260—309)

The present invention refers to the oxyethylation of imidazole compounds through reaction with ethylene carbonate.

The several methods of oxyethylation known from the literature are performed with ethylene oxide, ethylene chloridrine and also with ethylene carbonate. However, the oxyethylation of imidazole derivatives is not known to have been obtained through ethylene carbonate.

This method, which shows marked advantages as compared with the others, both from the standpoint of performance and yields, is the object of the present invention.

The reaction upon which the method of invention is grounded may be represented as follows:

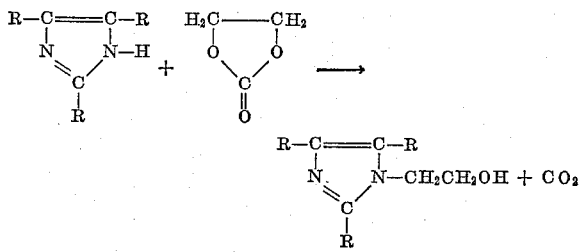

where R represents a hydrogen atom, a halogen atom, an alkylic or arylic group, or a nitro group.

Ethylene carbonate, according to the method of invention, may be used not only in stoichiometric quantities, but also as a solvent and, therefore, may be added in excess. The oxyethylation may be carried out in the absence of catalysts or in the presence of slightly alkaline or acid catalysts. The rate of reaction is influenced by the extent that catalysts are used or not. Also, by changing the nature of the catalyst to acid or alkaline, different isomers can be obtained.

The reaction between ethylene carbonate and imidazole derivates may be carried out at temperatures ranging from 80° to 160° C., preferably from 100° to 145° C., a more or less gradual increase being allowable during the reaction.

The isolation of the desired product from the mixed reagents can be obtained through known methods, e.g., by extracting, after acidification, the excess ethylene carbonate with an adequate water-immiscible solvent, and then isolating the oxyethyl-imidazole compound after alkalinization of the solution.

The following examples are given to illustrate the method of invention and they are not meant to limit the invention:

Example 1

In a flask provided with a stirrer, internal thermometer and reflux, the following ingredients were introduced:

| | Grams |
|---|---|
| Imidazole (M.P. 90–91° C.) | 10 |
| Ethylene carbonate | 20 |

The mixture was then heated to 100° C., for two hours and allowed to cool. 15 cc. concentrated hydrochloric acid were added. The solution was next extracted with chloroform to separate the ethylene carbonate which had not reacted. The acid water solution was then alkalized with potassium carbonate and extracted again with chloroform. The chloroform extract was concentrated to dryness in a water-bath and the residue rectified under vacuum. Through vacuum distillation, 7.13 gm. of 1-(2-oxyethyl)-imidazole were obtained, with a B.P. of 125–128° C. at 0.25 mm., $n_D^{18.8}=1.5190$. The yield was 43.2% of the theoretical value.

Example 2

The following ingredients were made to react to 100° C., for two hours in the same manner as in Example 1:

| | Grams |
|---|---|
| 2-methylimidazole (M.P. 137–140° C.) | 10 |
| Ethylene carbonate | 20 |

After having processed the reaction product as described above, 5 gm. of 1-(2-oxyethyl)-2-methyl-imidazole were obtained through vacuum distillation. The product had a B.P. of 130–133° C. at 0.15/0.25 mm., and the yield was 39% of the estimated theoretical value.

Example 3

The following ingredients were reacted at 120° C., for 4 hours in an apparatus as set forth in Example 1:

| | Grams |
|---|---|
| 5-nitro-2-methylimidazole | 10 |
| Ethylene carbonate | 50 |

They were then brought to 145° C. for another 3 hours. After the reacting mass was treated with chloroform in acid medium and the pH adjusted to 7, a small quantity of 1-(2-oxyethyl)-5-nitro-2-methylimidazole with M.P. 156–157° C. and 2 gm. of 1-(2-oxyethyl)-4-nitro-2-methyl-imidazole, with M.P. 140° C. were obtained.

Example 4

In the same manner as in Example 1, the following ingredients were reacted:

| | Grams |
|---|---|
| 5-nitro-2-methylimidazole | 10 |
| Ethylene carbonate | 20 |
| p-Toluenosulphonic acid | 5 |

The reaction was carried out under agitation at 130–135° C., for 15 hours. After cooling, water was added to the reacting mass which was then acidified with concentrated hydrochloric acid and extracted with chloroform to recover the ethylene carbonate which was not reacted. The acid solution was then alkalized with 30% sodium hydroxide, and extracted again with chloroform. This second chloroform extract was evaporated to dryness and the residue was recrystallized from isopropanol. The residue had a M.P. of 156–157° C. 4.2 gms. of 5-nitro-2-methyl-imidazole, with M.P. 241–242° C. was recovered, through neutralization, from the acid mother-waters.

Example 5

The same procedure and amounts set forth in Example 3 were used to react the sodium salt of imidazole (obtained through reaction of the imidazole with sodium alcoholate), with ethylene carbonate. A product is obtained which consisted solely of 1-(2-oxyethyl)-4-nitro-2-methyl-imidazole, which had an M.P. of 140° C.

What is claimed is:

1. A method for the preparation of oxyethyl-imidazole compounds of the formula

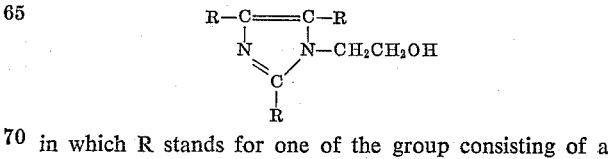

in which R stands for one of the group consisting of a hydrogen atom, a halogen atom, an alkylic, arylic residue, and a nitro group, comprising reacting imidazole derivatives of the formula

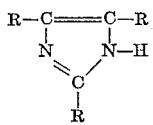

wherein R has the aforementioned values, with ethylene carbonate.

2. A method according to claim 1, wherein the reaction is carried out in the absence of catalysts.

3. A method according to claim 1, wherein the reaction is carried out in the presence of slightly alkaline catalysts.

4. A method according to claim 1, wherein the reaction is carried out in the presence of slightly acid catalysts.

5. A method according to claim 1, in which ethylene carbonate is used in excess of the stoichiometric quantities, and acts as a solvent.

6. A method according to claim 1, wherein the reaction is carried out by heating the reagents to temperatures ranging from 80 to 160° C.

7. A method according to claim 6, wherein the reaction is carried out by heating the reagents to temperatures ranging from 100 to 145° C.

References Cited by the Examiner
UNITED STATES PATENTS 2,448,767  9/48  Carlson _____ 260—573
2,944,061  7/60  Jacob et al. _____ 260—573

OTHER REFERENCES

Elderfield: "Heterocyclic Compounds," vol. 5, p. 205 (1957).

Carlson et al.: J. Am. Chem. Soc., vol. 69, p. 1952–6 (1947).

IRVING MARCUS, *Primary Examiner.*

DUVAL T. McCUTCHEN, WALTER A. MODANCE,
*Examiners.*